UNITED STATES PATENT OFFICE.

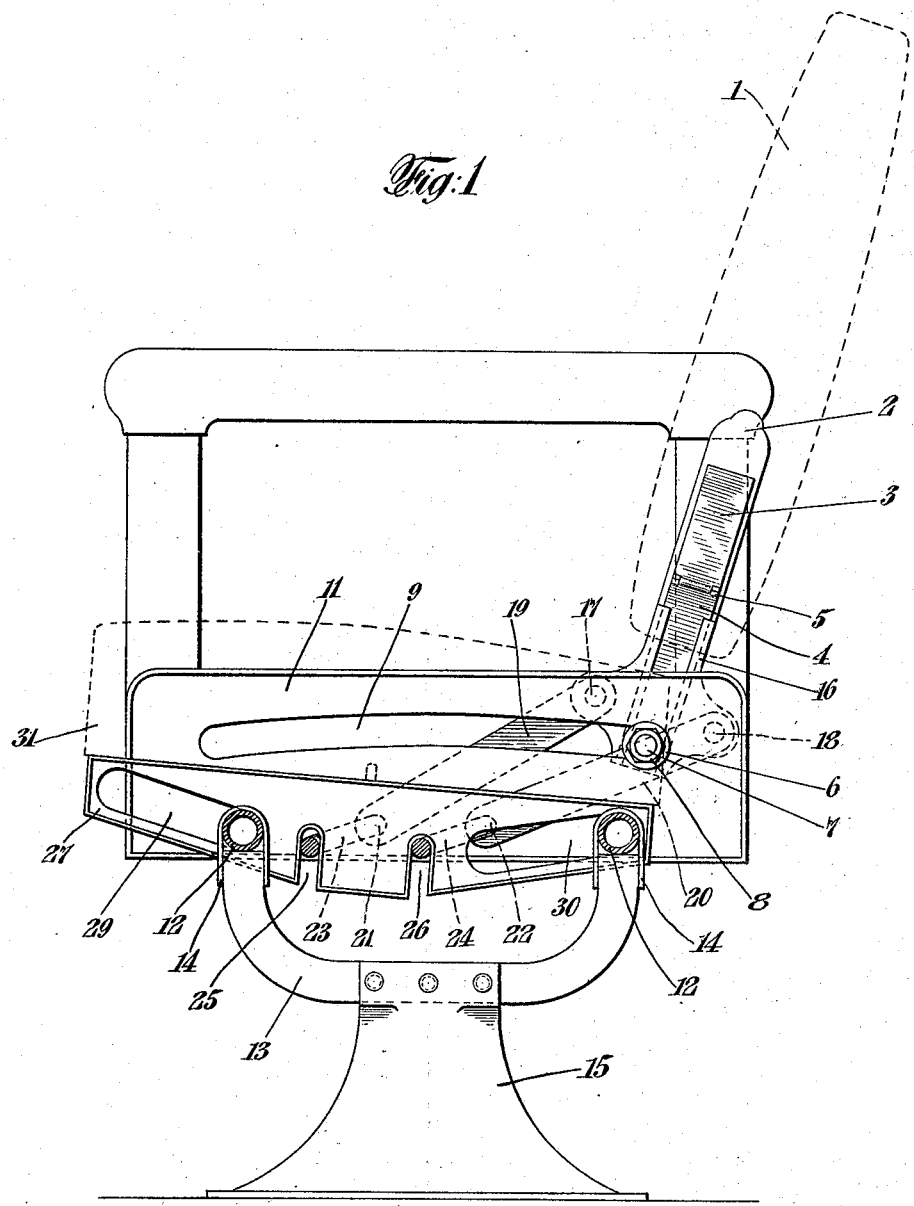

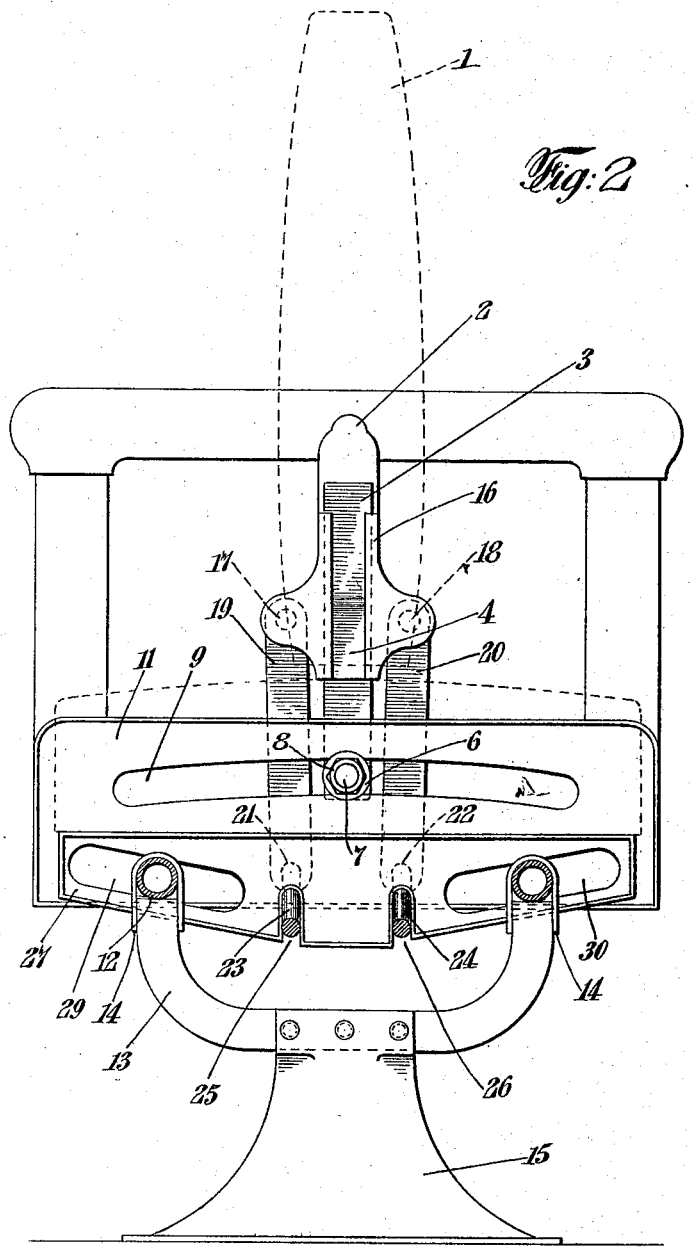

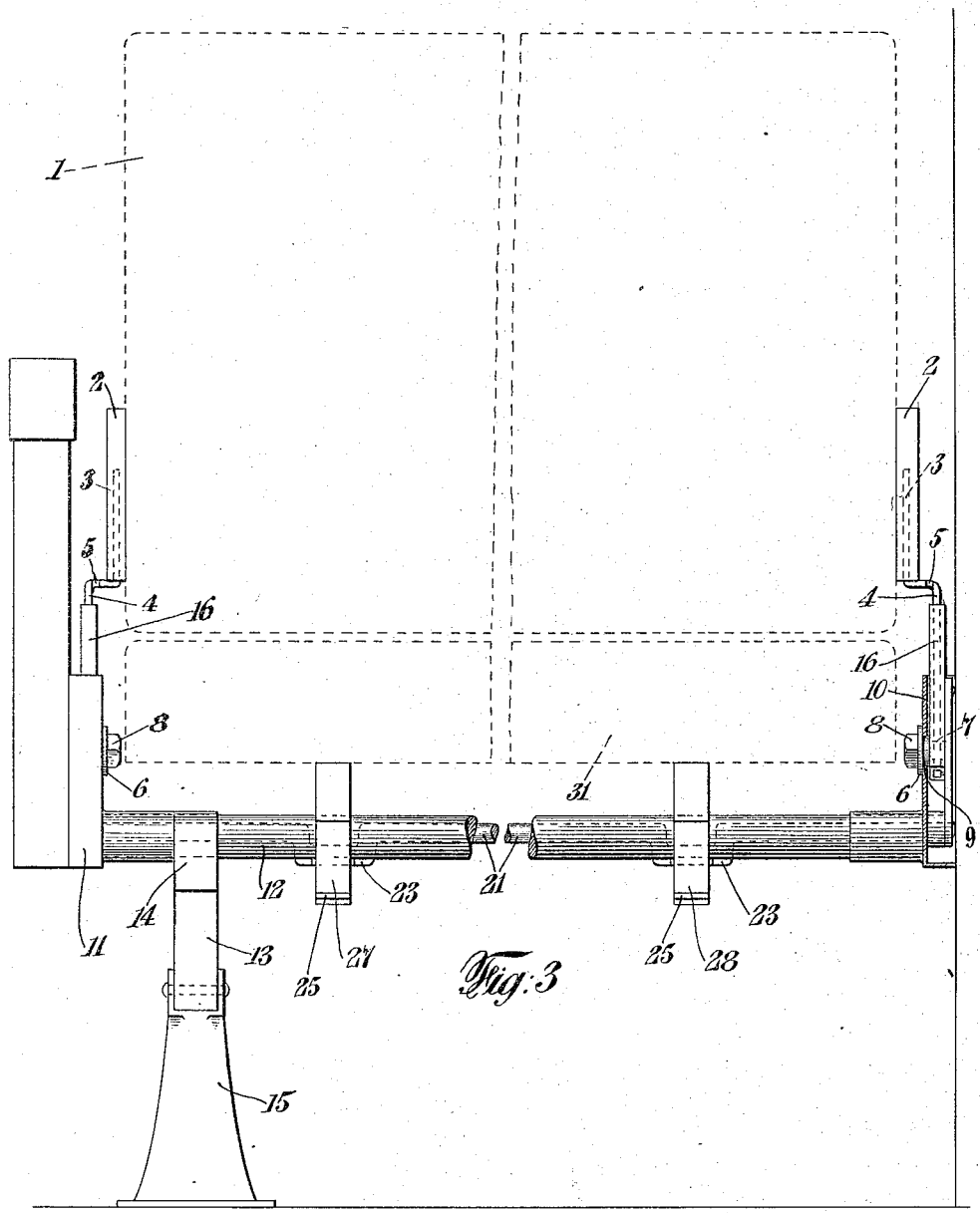

SHERIDAN A. WALKER, OF ELMHURST, NEW YORK, ASSIGNOR TO SHERIDAN A. WALKER CO., INC., OF NEW YORK, N. Y., A CORPORATION OF NEW YORK.

SHIFTABLE CAR-SEAT.

1,196,908.            Specification of Letters Patent.       Patented Sept. 5, 1916.

Application filed February 7, 1916. Serial No. 76,566

*To all whom it may concern:*

Be it known that I, SHERIDAN A. WALKER, of Elmhurst, in the county of Queens, and in the State of New York, have invented a certain new and useful Improvement in Shiftable Car-Seats, and do hereby declare that the following is a full, clear, and exact description thereof.

My invention relates particularly to car seats in which the back is arranged so that it may be shifted forwardly and rearwardly according to the direction in which the car is moving, and in which the cushion may be so arranged that it is simultaneously shifted by the movement of the back.

The object of my invention is to provide a seat of this character in which, while the desired angle of the back is maintained, any desired degree of elevation can be obtained during the shifting movement and in which any desired extent of throw forwardly and rearwardly can be obtained.

A further object of my invention is to provide such a car seat in which there is a sufficient resistance offered by the initial movement of the car seat in the shifting operation so as to avoid the accidental movement of the back when the car is starting or stopping, and when passengers are leaning against the same.

Still a further object of my invention is to provide a construction of this character which is incapable of binding.

A further object of my invention is to provide a car seat of this character in which the cushion is simultaneously shifted to the desired angle, while the back of the seat is being shifted.

Another object of my invention is to provide such a seat which is operated by a simple and efficient mechanism.

While my invention is capable of embodiment in many different forms, for the purpose of illustration I shall show only one form thereof in the accompanying drawings, in which, Figure 1 is a side elevation partly in section of a car seat made in accordance with my invention and showing the back at one end of the path of its movement; Fig. 2 is a similar view of the same showing the back in the middle position while being shifted; and Fig. 3 is a front elevation of the same partly in section.

In the drawings, I have shown a back 1 having a pair of guides 2 at its sides and near the lower end thereof. These guides 2 are adapted to slide over corresponding upwardly directed arms 3, having offset lower portions 4 with notches 5 located at the upper ends of said offset portions. Each of the arms 3 has at its lower end a flanged roller 6 carried on a stud shaft 7, attached to the arm, and which is provided with a nut 8 to maintain the roller 6 in place. The rollers 6 are arranged so as to move in slots or tracks 9 located in an inner end plate 10, and an outer end plate 11. The slots or tracks 9 may be of any desired curvature or shape so as to give any desired elevation to the back in its shifting movement, and so as to increase or decrease the resistance of the back to movement as desired. The inner end plate 10 may be attached to the wall of the car, but the outer end plate 11 is supported by means of two stationary cross-bars 12 which connect the two end plates 10 and 11 together, and which are supported near one end upon a U-bar 13 attached to the cross-bars 12, by means of straps 14 and supported from the floor by means of a pedestal 15. The lower offset portions 4 of the arms 3 are, furthermore, received at the two ends of the seat within sliding guides or brackets 16, each of which is provided with two pivots 17 and 18 for the attachment thereto of links 19 and 20, which links are carried at their lower ends upon fixed pivots in the end frames 10 and 11 by having fixedly secured to the links 19 and 20 rotary cross-bars 21 and 22, which extend through the end plates 10 and 11. These rotary cross-bars 21 and 22 intermediate their ends, are, furthermore, provided with lever arms 23 and 24 in the form of lateral offsets which engage with vertical slides 25 and 26 in two rocker frames 27 and 28 having slots 29 and 30, through which the stationary cross-bars 12 pass, said rocker frames being provided for supporting a cushion 31.

In the operation of my invention, it being assumed that the seat is in the position as shown in Fig. 1, when it is desired to shift the seat, as for example, when the direction of movement of the car is to be reversed, it is merely necessary to push against the top of the back 1, as for example, toward the left in Fig. 1. When this is done it will be found that there is a considerable degree of resistance initially to the movement of the back 1 and attached parts in shifting the same owing to the curvature of the track 9, which curvature may be changed as desired so as to increase or decrease the resistance in this initial movement and the elevation of the back in the shifting movement, and owing to the flat position of the links 19 and 20 and the sliding guides or brackets 16, and owing further to the fact that the shifting movement of the back 1, initially tends, to some extent, to move the upper ends of the levers 19 downwardly, while it is necessary in order to shift the back 1 to move the same upwardly upon the initial movement of the back. But as the back approaches the middle position there is no such resistance to the movement of the back, and the same may be readily shifted to the other end of its path without the presence of such resistance to the movement of the shiftable parts. At the same time, it is not necessary in the shifting of the seat to elevate the back to any considerable degree, and it follows thus that there is no danger to the breakage of the parts in the falling of the back at the end of its path of movement. Furthermore, in the shifting of the seat, there is at all times, an absence of any binding effect, as the rollers 6 merely determine the elevation of the back in the shifting movement, and as the angle of the back is determined by links having fixed pivots in the end plates, which links, at the two ends of the seat, are fixedly secured together by means of the rotary cross-bars 21 and 22. During the shifting movement of the back 1, furthermore, the sliding guides or brackets 16 may move upwardly through the notches 5, without interfering in any way with the back 1 or the guides 2, which are attached to the back. During the shifting movement, also, the cushion 31 is readily shifted to the desired angle by reason of the engagement of the angular slots 29 and 30 with the stationary cross-bars 12 and the engagement of the levers 23 and 24 with the vertical slots 25 and 26.

While I have described my invention above in detail, I wish it to be understood that many changes may be made therein, without departing from the spirit of my invention.

I claim:

1. A shiftable car seat having a back, a track determining the elevation of the back, and a pair of links pivoted on different axes determining the angle of the back.

2. A shiftable car seat having a back, a track determining the elevation of the back, and a pair of links, having fixed pivots pivoted on different axes determining the angle of the back.

3. A shiftable car seat having a back, a track, an arm supported therein, determining the elevation of the back, and a pair of links pivoted on different axes determining the angle of the back.

4. A shiftable car seat having a back, a track, an arm supported therein, determining the elevation of the back, and a pair of links, having fixed pivots, pivoted on different axes determining the angle of the back.

5. A shiftable car seat having a back, a track, a roller carrying an arm supported therein, determining the elevation of the back, and a pair of links pivoted on different axes determining the angle of the back.

6. A shiftable car seat having a back, a track, a roller carrying an arm supported therein, determining the elevation of the back, and a pair of links, having fixed pivots, pivoted on different axes determining the angle of the back.

7. A shiftable car seat having a back, a track, an arm supported at only one point therein, determining the elevation of the back, and a pair of links pivoted on different axes determining the angle of the back.

8. A shiftable car seat having a back, a track, an arm supported at only one point therein, determining the elevation of the back, and a pair of links, having fixed pivots, pivoted on different axes determining the angle of the back.

9. A shiftable car seat having a back, a track, a roller carrying an arm supported at only one point therein, determining the elevation of the back, and a pair of links pivoted on different axes determining the angle of the back.

10. A shiftable car seat having a back, a track, a roller carrying an arm supported at only one point therein, determining the elevation of the back, and a pair of links, having fixed pivots pivoted on different axes determining the angle of the back.

11. A shiftable car seat having a back, a track, a roller carrying an arm supported therein, determining the elevation of the back, a pair of links pivoted on different axes determining the angle of the back, and a sliding guide attached to the links and engaging the arm.

12. A shiftable car seat having a back, a track, a roller carrying an arm supported therein, determining the elevation of the back, a pair of links, having fixed pivots, pivoted on different axes, determining the angle of the back, and a sliding guide attached to the links and engaging the arm.

13. A shiftable car seat having a back, a track, a roller carrying an arm supported at only one point therein, determining the elevation of the back, a pair of links pivoted on different axes determining the angle of the back, and a sliding guide attached to the links and engaging the arm.

14. A shiftable car seat having a back, a track, a roller carrying an arm supported at only one point therein, determining the elevation of the back, a pair of links, having fixed pivots, pivoted on different axes, determining the angle of the back, and a sliding guide attached to the links and engaging the arm.

15. A shiftable car seat having a back, a track, a roller carrying an arm supported therein, determining the elevation of the back, a pair of links pivoted on different axes determining the angle of the back, and a sliding guide attached to the links and engaging the arm, said arm being offset at its lower end for engagement with the guide.

16. A shiftable car seat having a back, a track, a roller carrying an arm supported therein, determining the elevation of the back, a pair of links, having fixed pivots, pivoted on different axes, determining the angle of the back, and a sliding guide attached to the links and engaging the arm, said arm being offset at its lower end for engagement with the guide.

17. A shiftable car seat having a back, a track, a roller carrying an arm supported at only one point therein, determining the elevation of the back, a pair of links pivoted on different axes determining the angle of the back, and a sliding guide attached to the links and engaging the arm, said arm being offset at its lower end for engagement with the guide.

18. A shiftable car seat having a back, a track, a roller carrying an arm supported at only one point therein, determining the elevation of the back, a pair of links, having fixed pivots, pivoted on different axes, determining the angle of the back, and a sliding guide attached to the links and engaging the arm, said arm being slotted and offset at its lower end for engagement with the guide.

19. A shiftable car seat having a back, a track, a roller carrying an arm supported therein, determining the elevation of the back, a pair of links pivoted on different axes determining the angle of the back, and a sliding guide, attached to the links and engaging the arm, said arm being slotted and offset at its lower end for engagement with the guide.

20. A shiftable car seat having a back, a track, a roller carrying an arm supported therein, determining the elevation of the back, a pair of links, having fixed pivots, pivoted on different axes, determining the angle of the back, and a sliding guide attached to the links and engaging the arm, said arm being slotted and offset at its lower end for engagement with the guide.

21. A shiftable car seat having a back, a track, a roller carrying an arm supported at only one point therein, determining the elevation of the back, a pair of links pivoted on different axes determining the angle of the back, and a sliding guide attached to the links and engaging the arm, said arm being slotted and offset at its lower end for engagement with the guide.

22. A shiftable car seat having a back, a track, a roller carrying an arm supported at only one point therein, determining the elevation of the back, a pair of links, having fixed pivots, pivoted on different axes determining the angle of the back, and a sliding guide attached to the links and engaging the arm, said arm being slotted and offset at its lower end for engagement with the guide.

23. A shiftable car seat having a back, a track, determining the elevation of the back, a pair of links pivoted on different axes determining the angle of the back, a pair of similar levers at the other side of the seat and cross-bars fixedly securing the levers on the opposite sides of the seat.

24. A shiftable car seat having a back, a track determining the elevation of the back, a pair of links, having fixed pivots, pivoted on different axes, determining the angle of the back, a pair of similar levers at the other side of the seat and cross-bars fixedly securing the levers on the opposite sides of the seat.

25. A shiftable car seat having a back, a track determining the elevation of the back, a pair of links pivoted on different axes, determining the angle of the back, a pair of similar levers at the other side of the seat, cross-bars fixedly securing the levers on the opposite sides of the seat, a cushion and levers on said movable cross-bars for shifting the cushion.

26. A shiftable car seat having a back, a track determining the elevation of the back, a pair of links, having fixed pivots, pivoted on different axes, determining the angle of the back, a pair of similar levers at the other side of the seat, cross-bars fixedly securing the levers on the opposite sides of the seat, a cushion and levers on said movable cross-bars for shifting the cushion.

In testimony that I claim the foregoing I have hereunto set my hand.

SHERIDAN A. WALKER.

Copies of this patent may be obtained for five cents each, by addressing the "Commissioner of Patents, Washington, D. C."